May 18, 1943. G. W. McCULLOUGH 2,319,336
REGULATING MECHANISM FOR VALVES
Filed Aug. 22, 1941
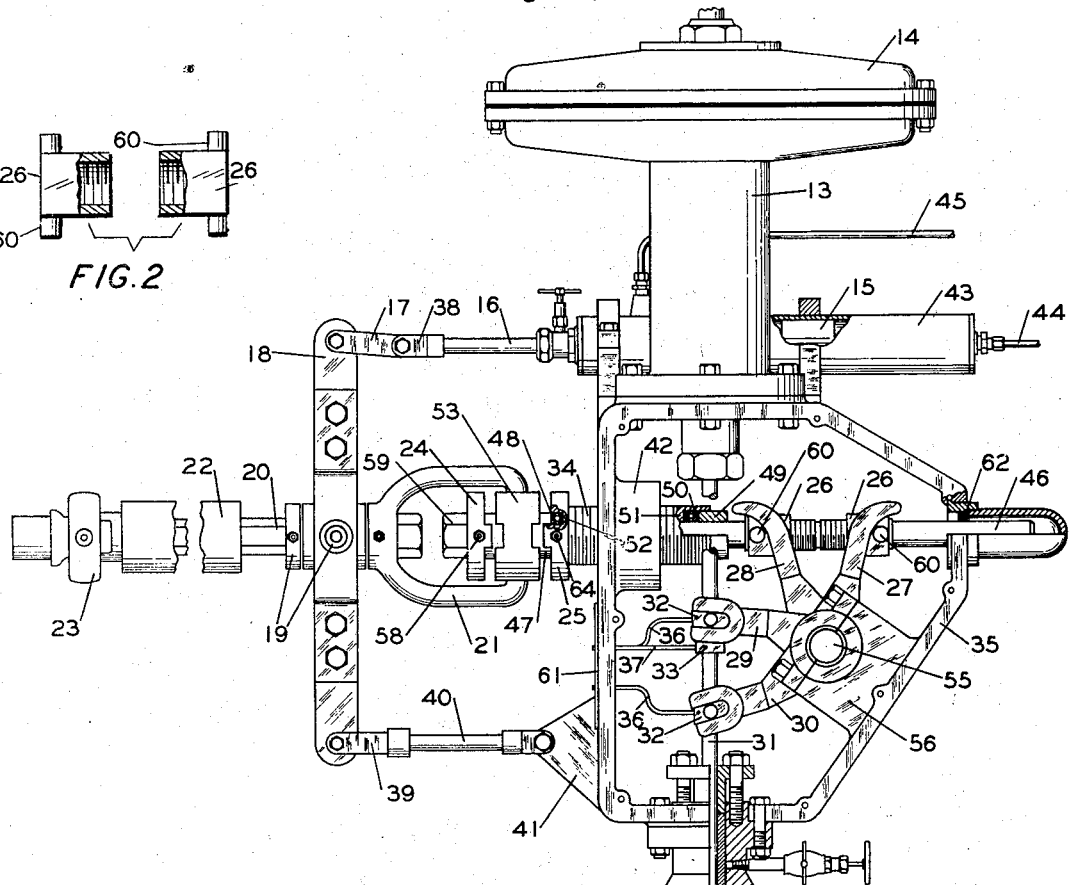
FIG.2
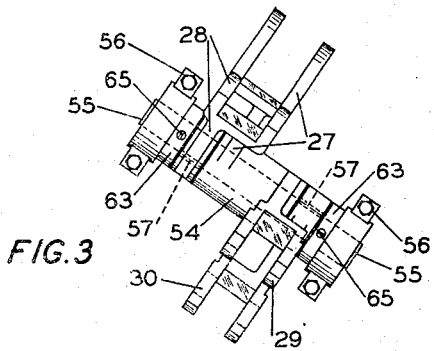
FIG.3
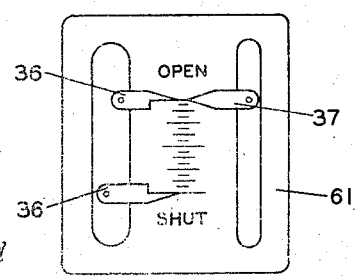
FIG.4
FIG.1
INVENTOR
GERALD W. McCULLOUGH
BY
Hudson, Young, Shanley + Yinger
ATTORNEY Patented May 18, 1943

2,319,336

UNITED STATES PATENT OFFICE 2,319,336

REGULATING MECHANISM FOR VALVES

Gerald W. McCullough, Bartlesville, Okla., assignor to Phillips Petroleum Company, a corporation of Delaware Application August 22, 1941, Serial No. 407,965

15 Claims. (Cl. 137—139)

This invention relates to improvements in a pneumatic shift control cylinder and valve stem travel stop adjustment mechanism for motor valves. The motor valves for which my improvement is especially adapted, are those operating under high pressure, for example, pressures of the order up to 5,000 pounds or even as high as 10,000 pounds per square inch, and at temperatures up to 1,000° F. or higher, yet my improvement is equally well adapted for use with lower pressure valves.

In manufacturing, refinery or gasoline plant operation, there are many applications involving pressure, temperature and flow controls which require the installation of the control valve, commonly called a motor valve, adjacent to the apparatus or at some intermediate point of a process and at a point usually remote from the operator's control room. Such applications require manual or gear operated mechanisms directly connected to the valve stem. In complex operating processes, it is rarely possible to set a control valve in a fixed position without limiting the flexibility and efficiency of the process. For this reason it has become most desirable to use an automatic resetting control to actuate hydraulically or pneumatically the diaphragm head of the control valve, as in conventional motor valves.

In ordinary commercial operations motor valves are not equipped with facilities to allow either manual or automatic actuation, or both, to permit precise positioning or provide for considerable travel limits of the inner valve stem. Such flexibility is required if the valve is to be able to be used for manual or automatic operation, each independent of the other.

In processes in which the location of the control valve is such as to be exposed to occasional or possible fires, it becomes not only desirable but necessary to provide, in addition to the automatically controlled diaphragm motor valve, mechanism for manually setting or adjusting the position of the inner valve of the motor or control valve without requiring the presence of the operator in hazardous areas, that is, the operator may make the adjustments from a remote point, as for example, in a remotely located control house.

Motor valves equipped with such setting or adjusting mechanisms permit positive movement of the inner control valve. By this valve movement against the valve port insert seat during passage of high pressure fluid through the valve, the velocity of the fluid passing under force of such pressures as 5,000 to 10,000 pounds pressure per square inch cleans and removes all coke, or decokes the valve seat.

An object of this invention is to provide a normally automatically operable motor valve, which may be manually operated from a remote distance.

Another object of this invention is to provide an automatically operable motor valve, the limits of valve operations of which may be manually controlled or set from a remote distance.

Still another object of this invention is to provide an automatically operable motor valve for high pressure and high temperature service, with provision for cleaning or decoking the valve seat and inner valve surface while the valve is in operation, the cleaning or decoking mechanism being operated at a distance remote from the valve, thereby not requiring the operator's going into the hazardous furnace area.

A further object is the provision of a means for setting the range of movement of a valve and also for setting the position of said range of valve movement between upper and lower limits.

These and other objects and advantages will be realized by those skilled in the art from a careful study of the following disclosure.

Figure 1 represents a high pressure motor valve with my improved manually or automatically operated controls thereon, partly in elevation and partly in section.

Figure 2 shows the trunnion blocks employed in the apparatus of Figure 1 with attached dogears.

Figure 3 shows an auxiliary view of the control screw levers and shaft assembly of Figure 1.

Figure 4 shows the valve travel indicator.

Like numerals refer to like members and parts of the apparatus represented in the several drawings.

Referring to the figures, numeral 10 represents the valve body of a high pressure, high temperature motor valve. This type of valve body is ordinarily equipped with stellite body liner, outlet liner, valve port insert, locking rings and guide bushing as standard equipment. The inner valve 11 also has a stellite surface. The finned bonnet 12 is commonly used on process applications in which high temperature material is passing through the valve. A spring barrel 13 of the enclosed type is shown, with interior springs, not shown, which are intended to hold the inner valve 11 off the seat in case the automatic motor valve diaphragm actuating pressure should fail. The diaphragm head 14 is equipped with a conventional diaphragm, and a top connection for attachment to the actuating hydraulic or pneumatic pressure source. This actuating pressure acting on the diaphragm tends to compress the springs and hold the inner valve 11 on its seat, and hence the valve closed to the passage of fluid. In case of failure of the actuating pressure, as mentioned above, the barrel springs exert their pressure and raise the diaphragm, thereby opening the inner valve 11 and allowing flow through the valve body.

My improvement and invention embodies the control housing 35 which encases apparatus added to the motor valve and inserted between the spring barrel 13 and the finned bonnet 12 of the motor valve. Additional apparatus, not encased in said control housing 35 comprises the pneumatic shifting mechanism. This latter portion of my improved apparatus comprises a pressure cylinder 43 with actuating air supply connections 44 and 45 into the ends thereof. The pressure cylinder 43 contains a piston 15 which in turn is connected to piston rod 16, to clevis 38, to link 17, and to shifting yoke 18. This shifting yoke is anchored to the control housing 35 by means of clevis 39, clevis rod 40 and flange 41. The shifting yoke 18 and spline shaft 20 are connected flexibly by the moving shift collar assembly 19. To the inner end of spline shaft 20 is attached the clutch yoke 21 by conventional means. The outer end of spline shaft 20 and spline sleeve 22 are of sufficient length and overlapping that the small movement of spline shaft 20 will not interfere with the manual rotation of the universal joint 23, the spline sleeve 22, the spline shaft 20, clutch yoke 21 and central clutch member 53. The central clutch member 53 engages either the outer clutch plate 24 or the inner clutch plate 25 or it may be positioned in a neutral position engaging neither clutch plate.

Extending from beyond outer clutch plate 24 into and through the manual control housing 35 is the control shaft 46. The outer clutch plate 24 is fixed rigidly to the control shaft 46 by essentially any suitable means, as for example, bolt 58 and nut 59, so that upon rotation of clutch plate 24 the entire control shaft 46 rotates.

Within the manual control housing 35 said control shaft 46 carries two movable trunnion blocks 26 which move in opposite directions on shaft 46 upon rotation of said shaft due to being threaded with opposite handed threads. Thus upon rotation of shaft 46, said trunnion blocks 26 move toward or become further separated from one another depending upon the direction of rotation of the shaft. The blocks travel longitudinally with respect to the axis of the shaft since the dogears 60 are held in position by the control screw levers 27 and 28 and thereby prevent rotation of the trunnion blocks with the control shaft 46. Ball bearing 62 supports the inner end of control shaft 46.

The inner clutch plate 25 is attached to the control screw 34 by any convenient means, as for example, two small bolts 64, one visible in the front circumference of inner clutch plate 25 and the other 180 degrees around and on the back circumference of said clutch plate. This control screw 34 carries external threads which mesh with internal threads of support 42, the latter being an integral part of the manual control housing 35. The said control screw is connected to control shaft by ball bearings 48 and 50. Into the inner end of the control screw 34 is fitted ball bearing 50 which latter is held in place by the shoulder 51 on one side and by the control shaft thrust collar 49 on the other side. Said thrust collar 49 is rigidly attached by any conventional means to the control shaft 46.

The ball bearing 48 is held in place in a manner similar to that described for bearing 50, that is by shoulder 52 and clutch thrust collar 47.

From this control shaft assembly as shown in Figure 1 and above described, it is obvious that the two clutch plates 24 and 25 are held apart by clutch thrust collar 47 and control screw 34 is fixed with respect to longitudinal movement along control shaft 46 by bearings 48 and 50 which are held in place respectively by collars 47 and 49.

The central clutch member 53 is free to rotate around clutch thrust collar 47 and also is free to move longitudinally thereon.

Thus by rotation of outer clutch plate 24, the trunnion blocks 26 move to become more or less widely separated from one another, depending upon the direction of rotation, and by rotation of the inner clutch plate 25, the entire control shaft 46 control screw 34 assembly moves further into or out of the control housing 35 depending upon the direction of rotation. When this latter movement takes place, the trunnion blocks and dogears do not move with respect to one another and they are maintained the same distance apart. When control screw 34 is turned, the position of the yoke control screw levers 27 and 28 with respect to the trunnion block dogears 49 prevents the rotation of the control shaft 46 and thereby causes the proper longitudinal movement of the control assembly.

The movement of the yoke control screw lever 27 moves the upper yoke travel stop lever 29 since both are an integral casting and mounted on a common hollow shaft 54, see Figure 3. This common shaft 54 is hollow and fitted to rotate at least through a small angle on shaft 55. The shaft 55 is attached to the inner wall of the control housing 35 by the bearing supports 56.

The yoke control screw lever 28 is fixed rigidly by key 57 or by other means to shaft 55 as is the lower travel stop lever 39 to prevent rotation of these levers on shaft 55. Shaft 55 is held in place longitudinally by collars 63 carrying set screws 65. Thus when trunnion blocks 26 on control shaft 46 move, the upper and lower travel stop levers 29 and 30, respectively, move also. The position along the valve stem 31 of trunnion stops 32 is determined by the position of the upper and lower travel stop levers 29 and 30. These trunnion stops 32 are equipped with dogears similar to those on trunnion blocks 26.

The valve stem 31 carries a rigidly fixed valve stem connector 33 which is located between the upper and lower trunnion stops 32.

To the upper and lower trunnion stops 32 are connected upper and lower travel stop pointers 36, as shown in Figures 1 and 4. These travel stop pointers indicate on the valve travel indicator 61 the manually set limits of travel of the valve stem 31. To the valve stem connector 33 is attached a valve stem travel pointer 37 as shown also in Figures 1 and 4. This pointer indicates also on valve travel indicator 61 the position of the valve stem at any time with respect to the manually set limits of travel, the former being indicated by the travel pointer 37 and the latter by the travel stop pointers 36.

Air connections 44 and 45 are connected by means of piping to an air supply which is regulated from the control house. Similarly the universal joint 23 is connected by a series of shafts, plain and/or bevel gears and other necessary connecting apparatus, not shown, to a control wheel in the above mentioned control house so that the operator may by manually rotating this control wheel rotate the control shaft 46 or the control screw 34, thereby setting the travel limits of the motor valve stem 31.

The valve travel indicator 61 shown in Figure 4 should preferably be connected to a recording apparatus of any suitable design which apparatus is then mounted in the above mentioned control house so that the entire inspection, adjustments and operation of the automatic motor valve may be made therefrom.

In the operation of this motor valve, by remote manual or automatic control the valve may be held (a) closed, (b) fully open or at any (c) intermediate point. In addition, (d) lower and upper limits for automatic operation may be adjusted and maintained from a remotely located control mechanism permitting automatic operation between these set limits.

(a) To close the valve completely, the operator admits air into air line 45 from a remotely located control room, piston 15 moves from left to right according to representation in Figure 1, thereby causing central clutch member 53 to mesh with inner clutch plate 25. The operator then by a remotely located manual revolving mechanism, not shown, turns universal joint 23 and by connecting parts control screw 34 is turned in the direction, according to the threads on said control screw, so that the control screw 34 carrying the control shaft 46 with trunnion blocks and dogears 26 moves from right to left in Figure 1, thereby causing upper travel stop lever 29 to move upper trunnion stop 32 in a downward direction. When this trunnion stop contacts valve stem connector 33 which is attached rigidly to the valve stem 31 the valve stem and valve are moved downward and this movement continued until valve 11 is closed with respect to its seat.

(b) To open the valve, air is admitted into 45, as above given, forcing piston 15 from left to right causing central clutch member 53 to mesh with inner clutch plate 25. Then from the remotely located manual control, the control screw 34 is rotated in the reverse direction from that given above under (a) and the control screw 34—control shaft 46 assembly travels from left to right and in so doing the left trunnion block 26 moves to cause the lower trunnion stop 32 to be moved upwardly until it contacts valve stem connector 33. Upon continued upward movement of said lower trunnion stop 32 the valve stem 31 is raised thereby opening valve 11.

(c) The valve may be partially opened and maintained in that position during manually controlled refining or manufacturing operations. From the aforementioned remotely located controls, air is admitted through air connection 44, thereby causing piston 15 to move from right to left according to the drawing. This piston movement causes central clutch member 53 to mesh with the outer clutch plate 24. Then from the remotely located controls, not shown, the operator turns universal joint 23, the rotation being carried by connecting parts to the central clutch member 53. In this position the revolving central clutch member 53 revolves the outer clutch plate 24 which in turn revolves control shaft 46, thereby moving trunnion blocks 26. The direction of rotation of said control shaft 46 is such and depends on the directions of threading on the shaft, as to move the trunnion blocks 26 closer together. By continuing the rotation of control shaft 46, the upper and lower trunnion stops 32 are likewise moved closer toward one another until they both touch and hold firmly the valve stem connector 33. Then by admitting control air into air inlet 45 and operating the remotely located manual control mechanism, as described above, for turning control screw 34 the valve 11 may be entirely closed, entirely opened or maintained in any intermediate position. Under these conditions the valve is not free to operate automatically from the diaphragm head 14.

(d) For automatic operation between limits for partially opening and partially closing the motor valve, these limits may be set and maintained by my manual remote control mechanism. Thus by the proper spacing of the trunnion stops 32 as controlled by rotation of the control shaft 46, and by the location of these trunnion stops 32 with respect to the valve stem connector 33 as controlled by rotation of the control screw 34 and by the setting of the said valve stem connector on the valve stem 31, automatic operation as controlled from the diaphragm head 14 may be accomplished. For the automatic operation it is preferable to maintain central clutch member 53 in the neutral position and not meshing with either clutch plate 24 or 25.

The tension of the barrel springs within spring barrel 13 is intended to be such that if the actuating hydraulic or pneumatic pressure operating the diaphragm head 14 should fail, the valve will be raised by said spring to the upper set travel limit, thereby not forcing closing down of the process. Should this condition occur, the valve may then be manually controlled and operated as heretofore explained.

When a valve is inserted in high temperature refining process such as thermal alkylation, polymerization and cracking, it frequently happens that valves are clogged by coke deposits. One advantage of my invention resides in the fact that when operating at high pressures such as 5,000 or 10,000 pounds per square inch coke deposits may be removed from said valves without interrupting operations. This "decoking" step may be carried out by lowering the valve stem 31 and valve 11 as hereinbefore disclosed until the valve is just barely open. Under this condition, the very high velocity of the fluid passing under force of such pressures as 5,000 or 10,000 pounds per square inch cleans and removes all coke from the valve and its seat without disrupting operation. After the cleaning or decoking operation is completed, the valve travel stops are reset and the valve put back on automatic operation.

It is not intended to limit my invention to the particular design as shown since many modifications and variations may be made and yet remain within the intended spirit and scope of my invention.

Materials for construction of parts may be selected from those best suited for the purpose.

I claim:

1. In a motor valve mechanism including a valve casing, a valve movable between upper and lower limits in said casing and a valve stem, means for setting intermediate range of valve travel comprising a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop and means for communicating rotation to said control shaft.

2. In a motor valve mechanism including a valve casing, a valve movable between upper and lower limits in said casing and a valve stem, means for setting intermediate range of valve travel comprising a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop and means for communicating rotation to said control shaft comprising a clutch plate fixed to the control shaft and a clutch member for operating said clutch plate.

3. In a motor valve mechanism including a valve casing, a valve movable between upper and lower limits in said casing and a valve stem, means for setting intermediate limits for the range of valve movement including a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop, and means for setting the relative position of the range of valve movement between said upper and lower limits.

4. In a motor valve mechanism including a valve casing, a valve movable between upper and lower limits in said casing and a valve stem, means for setting intermediate limits for the range of valve movement including a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop, and means imparting endwise movement to said control shaft for setting the relative position of the range of valve movement.

5. In a motor valve mechanism including a valve casing, a valve movable between upper and lower limits in said casing and a valve stem, means for setting intermediate limits for the range of valve movement including a housing, a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop, means for setting the relative position of the range of valve movement between said upper and lower limits including a hollow control screw exteriorly threaded to said housing and receiving said control shaft in a longitudinally fixed relation, rotation of said control screw imparting endwise movement to said shaft, an inner clutch plate fixed to said control screw, an outer clutch plate fixed to said control shaft, and an intermediate clutch member for selectively operating said inner and outer clutch plates.

6. In a motor valve mechanism including a valve casing, a valve movable between upper and lower limits in said casing and a valve stem, means for setting intermediate limits of valve movement comprising means for setting intermediate limits for the range of valve movement including a housing, a control shaft having oppositely threaded sections, members threaded to the control shaft on said sections and movable in opposite directions thereon by relative rotation of said shaft, a stop for said valve stem, pivoted levers having corresponding ends movable by said members, the opposite ends of said levers being movable adjustably along said valve stem and limiting the movement thereof by means of said stop, an outer clutch plate communicating rotation to said control shaft to set the intermediate limits for the range of valve movement, and means for setting the relative position of the range of valve movement including a hollow control screw exteriorly threaded to said housing and receiving said control shaft in a longitudinally fixed relation, rotation of said control screw imparting endwise movement to said shaft, an inner clutch plate fixed to said control screw, and an intermediate clutch member for selectively operating the outer clutch plate to cause the opposite ends of said pivoted levers to fixe the intermediate limits of range of travel of the valve and for selectively operating the inner clutch plate to impart endwise movement to said control shaft to fix the position of the range of valve movement.

7. In a valve mechanism including a valve casing, fluid inlet and outlet passages for said casing, a valve movable between upper and lower limits in said casing and a valve stem, means for setting intermediate valve travel limits comprising a control shaft, a stop for said valve stem, pivoted control levers, means associated with said control shaft on rotation thereof to impart opposite movement to corresponding ends of said levers, the other ends of said levers being movable adjustably along said valve stem and limiting the movement thereof by means of said stop and means for communicating rotation to said control shaft.

8. In a valve mechanism including a valve casing, fluid inlet and outlet passages for said casing, a valve movable between upper and lower limits in said casing and a valve stem, means for setting intermediate limits determining the range of movement for said valve comprising a control shaft, pivoted control levers, means associated with said control shaft on rotation thereof to impart movement to corresponding ends of said levers in opposite directions, a stop for said valve stem, the opposite ends of said levers being movable adjustably along said valve stem and limiting the movement thereof by means of said stop, means for communicating rotation to said control shaft to set the range of movement for said valve and means for imparting endwise movement to said control shaft to locate the relative position of the range for valve movement between said upper and lower limits.

9. In a valve mechanism including a valve casing, fluid inlet and outlet passages for said casing, a valve movable between upper and lower limits in said casing and a valve stem, means for setting intermediate limits determining the range of movement for said valve comprising a control shaft, pivoted control levers for said control shaft, means associated with said control shaft imparting movement to corresponding ends of said levers in opposite directions on rotation of said control shaft, a stop for said valve stem, the opposite ends of said levers being movable adjustably along said valve stem and limiting the movement thereof by means of said stop, means for imparting endwise movement to said control shaft thereby determining the relative position of the range for valve movement between said upper and lower limits, and control means for selectively setting intermediate limits for the range of valve movement and setting the range between said upper and lower limits.

10. A control mechanism for motor valves including a valve casing, fluid inlet and outlet passages for said casing, a valve movable between upper and lower limits in said casing and a valve stem, means for setting intermediate limits for the movement of said valve comprising a stop for said valve stem, a housing, a control shaft journaled in said housing at one end, a hollow control screw exteriorly threaded to said housing and receiving an opposite section of said control shaft for imparting endwise movement thereto, oppositely threaded sections on said control shaft, members threaded to the control shaft on said sections and movable in opposite directions thereon by relative rotation of said shaft, a pivot shaft mounted in said housing, levers pivoted on said shaft having corresponding ends movable by said members, the opposite ends of said levers being movable adjustably along said valve stem and limiting the movement thereof by means of said stop, and clutch means selectively imparting rotation to said control shaft to determine the magnitude of movement of said valve and rotating said control screw thereby imparting endwise movement to said shaft and determining the relative position for said range of valve movement.

11. A control mechanism for motor valves including a valve casing, fluid inlet and outlet passages for said casing, a valve movable between upper and lower limits in said casing and a valve stem, means for setting intermediate limits for the movement of said valve comprising a housing, a control shaft, a bearing in the housing supporting one end of the control shaft and permitting endwise movement thereof, a hollow control screw exteriorly threaded to said housing, the interior of said control screw forming a bearing for the opposite end of said control shaft but preventing longitudinal movement thereof relative to the control screw, whereby endwise movement is imparted to said control shaft by relative rotation of the control screw, control levers pivoted in said housing, means associated with the control shaft imparting movement to corresponding ends of said levers in opposite directions, a stop on said valve stem, the opposite ends of said levers being movable adjustably along said valve stem and limiting the movement thereof by means of said stop, and control means selectively setting intermediate limits for the range of movement of said valve and fixing the range of valve movement between said upper and lower limits.

12. A control mechanism for motor valves including a valve casing, fluid inlet and outlet passages for said casing, a valve movable between upper and lower limits in said casing and a valve stem, means for setting intermediate limits for the movement of said valve comprising a housing, a control shaft, a bearing in the housing supporting one end of the control shaft and permitting endwise movement thereof, a hollow control screw exteriorly threaded to said housing, the interior of said control screw forming a bearing for the opposite end of said control shaft but preventing longitudinal movement thereof relative to the control screw, whereby endwise movement is imparted to said control shaft by relative rotation of the control screw, control levers pivoted in said housing, means associated with the control shaft imparting movement to corresponding ends of said levers in opposite directions, a stop on said valve stem, the opposite ends of said levers being movable adjustably along said valve stem and limiting the movement thereof by means of said stop, and clutch means for selecting rotation of said control screw and said control shaft, said means being remotely controlled by fluid pressure.

13. In a valve mechanism including a valve casing, a valve movable between upper and lower limits in said casing and a valve stem, means for fixing rigidly the position of the valve between said upper and lower limits comprising a housing, a hollow control screw exteriorly threaded to said housing, a control shaft, a bearing in said housing for one end of the control shaft and permitting endwise movement thereof, the interior of the control screw forming a bearing for the opposite end of said control shaft, said control shaft being fixed against longitudinal movement relative to said control screw, lever means pivoted in said housing, one end of which being connected to said control shaft, and the opposite end connected to said valve stem whereby the position of said valve is determined by relative rotation of said control screw.

14. In a motor valve mechanism including a valve casing, a valve movable between upper and lower limits in said casing and a valve stem, means for setting intermediate limits of valve movement comprising means for setting intermediate limits for the range of valve movement, means for setting the relative position of the range of valve movement between said upper and lower limits, and clutch controlled means remotely operable to selectively set the intermediate limits of valve movement and the range of valve movement between said upper and lower limits.

15. In a valve mechanism including a valve casing, a valve movable between upper and lower limits in said casing and a valve stem, means for setting intermediate limits of valve movement comprising means for setting intermediate limits for the range of valve movement, means for setting the relative position of the range of valve movement between said upper and lower limits, and control means common to both of said means for selectively setting the intermediate limits of valve movement and the range of valve movement between said upper and lower limits.

GERALD W. McCULLOUGH.